May 30, 1939.   O. L. BECK   2,160,011
AUTOMOBILE DOOR LOCKING APPARATUS
Filed Oct. 18, 1937
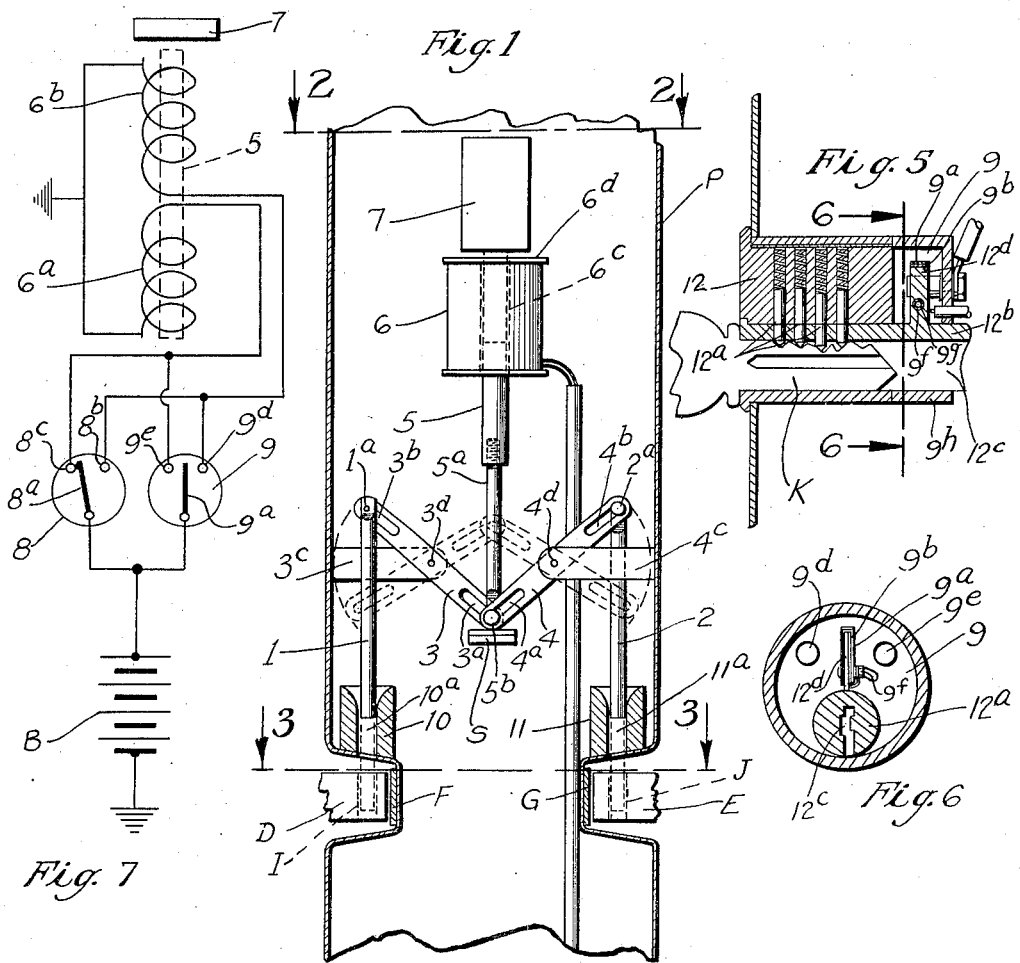
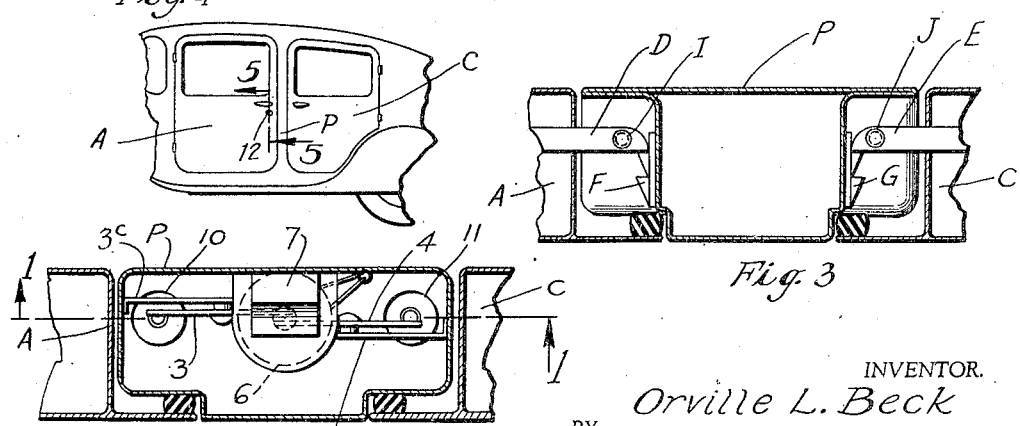
INVENTOR.
Orville L. Beck
BY A. B. Bowman
ATTORNEY.

Patented May 30, 1939

2,160,011

UNITED STATES PATENT OFFICE 2,160,011

AUTOMOBILE DOOR LOCKING APPARATUS

Orville L. Beck, Dahlgren, Va.

Application October 18, 1937, Serial No. 169,590

5 Claims. (Cl. 70—264)

My invention relates to an automobile door locking apparatus, and the objects of my invention are:

First, to provide a door locking apparatus for use on automobiles;

Second, to provide an electrically operated door locking apparatus for use on automobiles;

Third, to provide a door locking apparatus which in one operation will either lock or unlock all the doors of the automobile;

Fourth, to provide an automobile door locking apparatus which may be operated either from the inside of the automobile or from the outside of the automobile;

Fifth, to provide an automobile door locking apparatus which is concealed within the body of the automobile, out of reach of anyone attempting to break into said automobile;

Sixth, to provide on the whole a novelly constructed automobile door locking apparatus which is relatively simple and economical of construction in proportion to its function, and which is durable, efficient in its action, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and the characters of reference thereon which form a part of this application in which:

Figure 1 is a sectional view taken along the line 1—1 of Fig. 2, and shows parts and portions in elevation to facilitate the illustration; Fig. 2 is a sectional view taken along the line 2—2 of Fig. 1, and shows the doors A and C fragmentarily; Fig. 3 is a sectional view taken along the line 3—3 of Fig. 1, and shows the doors A and C fragmentarily; Fig. 4 is a fragmentary side elevational view of an automobile, and shows in particular the position of the post P with respect to the doors A and C of the automobile; Fig. 5 is a fragmentary sectional view through the door lock 12, taken along line 5—5 of Fig. 4 and shows in particular the door lock electric switch member 9 in connection therewith; Fig. 6 is a sectional view along the line 6—6 of Fig. 5; and Fig. 7 is a diagrammatic illustration of the electric circuit employed in connection with automobile door locking apparatus.

Similar characters of reference refer to similar parts and portions throughout the several views of the drawing:

Lock pins 1 and 2, links 3 and 4, solenoid plunger 5, solenoid 6, permanent magnet 7, electric switch 8, door lock electric switch 9, lock pin guides 10 and 11, and door lock 12 constitute the principal parts and portions of my automobile door locking apparatus.

Excepting for the switches 8 and 9, and the source of electrical energy, battery B, the entire apparatus is positioned within the post P between the doors A and C of the automobile, as shown best in Figs. 1 and 4 of the drawing. The post P in cross section is substantially as shown in Fig. 2 of the drawing throughout most of its length, excepting at the point where the door bolt D of the door A, and the door bolt E of the door C engage their respective bolt catch members F and G. At this point, the cross section of the post member P is substantially as shown in Fig. 3 of the drawing. This figure is taken along the line 3—3 of Fig. 1. At the point in the post P where the door bolt D engages the bolt catch member F, the post P is recessed to receive this catch member F and the door bolt D; at a point on the opposite side of post P there is a similar recess to receive the door bolt catch member G and the door bolt E. These recesses are shown best in Figs. 1 and 3 of the drawing. The door bolt D is provided with a bore I to receive the lock pin 1, and the door bolt E is provided with a bore J to receive the lock pin 2. The lower end of the pin 1 is positioned within the lock pin guide member 10 which member 10 is positioned immediately above the end of the door bolt D when said door A is closed. To lock the door A, the pin 1 drops through the bore 10a in the guide member 10 into the bore I of the door bolt D in the door A. At the same time, the end of the pin 2 drops through the bore 11a of the guide 11 into a bore J within the door bolt E of door C. This is illustrated by the broken lines in Fig. 1 of the drawing. When the door bolts D and E are in position to receive their respective pin members 1 and 2, these door bolt members D and E are in engagement with their respective bolt catch members F and G, as shown best in Fig. 3 of the drawing. To unlock the doors A and C, their respective lock pins 1 and 2 are withdrawn from the respective door bolts D and E to a position shown for the pins 1 and 2 in Fig. 1 of the drawing. This is done by means of the solenoid 6, plunger 5 and the link members 3 and 4.

The solenoid 6 is double wound; that is, it has the two windings of 6a and 6b, as indicated in Fig. 7 of the drawing. The windings 6a and 6b are on a spool having a bore 6c extending therethrough. This solenoid 6 is secured to the inside of the post P by the end member 6d and is held in the position shown for it in Figs. 1 and 2 of the drawing by this end member 6d. The solenoid plunger 5 is of soft iron; and one end of this plunger 5 is within the lower end of the bore 6c in the solenoid 6; the other end of the plunger 5 is screw threaded to one end of the plunger rod 5a. Thus, the plunger 5 and the plunger rod 5a form one continuous member. The lower end of the plunger rod 5a is pinned through slots 3a and 4a of the link members 3 and 4 respectively by means of pin 5b. The link member 3 is pivotally secured by the pin 3d to the support member 3c. The support member 3c is secured to the inside of the post P. The link member 4 is pivotally secured to the support member 4c by means of the pin 4d. This support 4c is secured to the inside of the post P. The upper end of the lock pin 1 is pivotally secured to one end of the link member 3 by the pin 1a extending through the slot 3b of link member 3. The upper end of the lock pin 2 is secured to one end of the link member 4 by means of the pin 2a extending through the slot 4b of link member 4. The lower end of the lock pin 1 will always rest within the bore 10a of the pin guide 10, and the lower end of the lock pin 2 will always rest within the bore 11a of the pin guide 11, when the doors A and C are unlocked. The plunger member 5 will be in the position shown for it by solid outline in Fig. 1 of the drawing when the doors A and C are unlocked. This plunger 5 will be retained in this position by the stop member S, which member S is secured within the post member P and serves to prevent the plunger 5 from falling out of the bore 6c within the solenoid 6.

In Fig. 7 of the drawing, one end of each solenoid winding 6a and 6b is electrically connected in common with the ground; the other end of each solenoid winding 6a and 6b connects with the electric switches 8 and 9. The switches 8 and 9 connect in common with a source of electrical energy B, such as an automobile storage battery. The negative side of this storage battery is shown grounded. The solenoid plunger 5 is shown extending through the windings 6a and 6b by broken lines, and immediately positioned above the upper end of this plunger 5 is indicated permanent magnet 7. The switch 8 is an ordinary single pole double throw electric switch and is to be positioned inside the automobile, preferably on the dashboard of the automobile. The switch 9 is also a single pole double throw electric switch and is used in connection with the door lock 12. This switch 9 is shown in detail in Figs. 5 and 6 of the drawing and will be described in more detail hereinafter. When the doors of the automobile are to be locked, plunger member 5 must be raised from the position shown for it by solid outline in Fig. 1 of the drawing to a position where its upper end rests against the permanent magnet 7, as indicated by dotted lines in Fig. 1 of the drawing; and the pin members 1 and 2 will be moved in connection with plunger 5 through their respective link members 3 and 4 from the position shown for them by solid outline in Fig. 1 of the drawing to the positions shown for them by broken lines in Fig. 1 of the drawing so that the lock pins 1 and 2 extend into their respective bores I and J in the door bolts D and E. This is done by energizing the windings 6a of the solenoid 6. The magnetic field created within the bore 6c by the current flowing through the windings 6a will be of sufficient strength to lift the solenoid plunger 5 from the position shown for it in Fig. 1 of the drawing to a position where its upper end is against the permanent magnet 7. This may be accomplished by using either one of the two switches 8 or 9. If switch 8, which is within the car, is to be used, the switch blade 8a is turned to contact with the element 8c thus placing the winding 6a electrically in series with the battery B. If the switch 9 is to be used, the switch blade 9a must be brought into contact with the element 9e, so that the solenoid winding 6a is placed in series with the battery B. When the upper end of the plunger 5 has been brought into engagement with the permanent magnet 7, the plunger 5 will remain in this position because of the magnetic attraction between the permanent magnet 7 and the plunger 5. Hence the winging 6a does not need to be energized all the time the doors are to remain locked; but only long enough to lock them. As long as the plunger 5 remains in contact with the magnet 7, the doors A and C will remain locked. To unlock these doors A and C, it is necessary to pull the plunger 5 away from the magnet 7. This is accomplished by means of the solenoid winding 6b. When this solenoid winding 6b is energized, the magnetic field within the bore 6c of the solenoid 6 should be of sufficient strength and of the proper directional quality to pull the plunger 5 away from the magnet 7. When this happens, the plunger 5 will return to the position shown for it by solid outline in Fig. 1 of the drawing; and the lock pins 1 and 2 will be raised to the position shown for them by solid outline in Fig. 1 of the drawing, thus unlocking the bolt members D and E of the doors A and C respectively. This solenoid winding 6b may be energized by either switch 8 or switch 9. If switch 8 is to be used, the switch blade 8a must be shifted to contact the element 8b, thus placing the solenoid winding in series with the storage battery B; if switch 9 is to be used, the switch blade 9a must be brought into contact with the element 9d, thus energizing the solenoid winding 6b.

The electric switch 9 is used in connection with the door lock 12; this lock 12 is shown positioned on the outside of the front door A of the automobile in Fig. 4 of the drawing. In Fig. 5 of the drawing, the physical embodiment of the switch 9 is shown in connection with the door lock 12. This lock is of the conventional pin tumbler type. A plurality of tumblers 12a are shown. The key plug 12b which extends through the lock 12 into the casing 9h of the electric switch 9, has a slot 12c to receive a key K; this key plug 12b may rotate within the body of the switch 9 and the body of the lock 12. This key plug 12b is provided on its upper side with an extension 12d, which extension 12d is integral with the key plug 12b. Over the end of this key plug 12b, and extending over its side some distance, is placed a strip of insulating material 9b. Over the outside of this strip of insulating material 9b is placed a metallic strip 9a; both the insulation 9b and the metallic strip 9a are secured to the extension member 12d by means of the bolt 9f. This bolt 9f is separated from metallic contact with the extension member 12d by the insulation 9g. In connection with this bolt 9f is an electric conductor which is mounted in an arcuate slot in the member 9h and which connects with the storage battery B. The metallic strip 9a serves as the switch blade 9a as shown in the diagrammatic view of Fig. 7, and makes contact with either of the stud contact members 9d or 9e when the key K is placed in the key plug 12b and the plug 12b is rotated. In this way, either the solenoid winding 6a or the solenoid winding 6b may be energized.

The operation of my automobile door locking apparatus is as follows:

The doors of the automobile must first be closed. If the operator of the automobile wishes to lock the doors of the vehicle and at the same time remain within the automobile, he may do so by using the electric switch 8. This switch 8 may be placed on the dashboard of said automobile; and the doors may be locked by the vehicle operator from within the vehicle by causing the switch blade 8a to contact the switch element 8c, thus energizing the solenoid coil 6a. When this is done, the plunger 5 will be drawn up into the bore 6c within the solenoid 6 against the permanent magnet 7 and this plunger 5 will remain in contact with this permanent magnet 7 until it is pulled away therefrom. The plunger 5 may be pulled away from magnet 7 by energizing the other solenoid winding 6b. When the plunger 5 is drawn up into the solenoid 6 the lock pins 1 and 2 through their respective link members 3 and 4 are dropped through their respective guide members 10 and 11 into engagement with their respective door bolts D and E, thus locking the doors A and C. To unlock the doors, the switch blade 8a is brought into contact with the switch element 8b, thus energizing the solenoid winding 6b. When this happens, the plunger 5 is pulled away from the permanent magnet 7, and the lock pins 1 and 2 are raised up from engagement with their respective door bolts D and E. The stop member S prevents the plunger 5 from withdrawing completely from within the bore 6c within the solenoid 6 and also prevents the lock pins 1 and 2 from being completely withdrawn from their respective guides 10 and 11.

If the doors of the vehicle are to be locked from the outside, the electric switch 9 must be used. This is done by inserting a key K into the door lock 12 and turning the key and consequently the key plug 12b to a position where the electric switch blade 9a contacts the electric switch element 9e, thus energizing the solenoid winding 6a. When this happens, the lock pins 1 and 2 will lock their respective doors A and C. To unlock the doors from the outside, the switch blade 9a is turned as hereinbefore described to contact the switch element 9d, thus energizing the solenoid winding 6b. When this happens, the lock pins 1 and 2 are withdrawn from their respective door bolts D and E, thus unlocking the doors A and C.

Although the apparatus disclosed by the drawing is shown for use with two doors on one side of an automobile, it is obvious that a similar apparatus may be positioned to be used on the opposite side of the automobile, and that by placing the solenoid windings of this other apparatus on the opposite side of the automobile, in parallel connection with the solenoid windings 6a and 6b, all four doors of an ordinary four door sedan may be either locked or unlocked by one operation of either of the switches 8 or 9; and further, although this apparatus is shown adapted for use between a pair of automobile doors, by eliminating the lock pins 1 and 2 and the link members 3 and 4, the rest of the apparatus may be adapted to be used on a single door, the rod 5a serving as a lock pin. Hence, the apparatus may be used on either a four door sedan or a two door vehicle.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In an apparatus of the class described, a solenoid, a plunger positioned to move within said solenoid, a pair of pin members for engaging and locking the bolts of a pair of doors of an automobile, and link members operatively connected between said pin members and said plunger, the said plunger in response to the magnetic field created by said solenoid actuating the said pin members by means of said link members.

2. In an apparatus of the class described, a solenoid, a plunger positioned to move within said solenoid, a pair of pin members for engaging and locking the bolts of a pair of the doors of an automobile, link members operatively connected between said pin members and said plunger, the said plunger in response to the magnetic field created by said solenoid actuating the said pin members by means of said link members, and a permanent magnet positoned with respect to the said plunger so as to hold by magnetic attraction the said plunger in a position to maintain said pin members in a locked postion with their respective door bolts.

3. In an apparatus for locking automobile doors, a pair of pin members positioned between a pair of automobile doors to engage the bolts of the automobile doors and a means for actuating said pin members to either lock or unlock the said doors, including a solenoid in connection with a source of electric energy for magnetically actuating said pin members, said pair of pin members and their actuating means including said solenoid being positioned within and enclosed by a member between said pair of automobile doors.

4. In an apparatus of the class described, a double wound solenoid, a plunger positioned to reciprocate within said solenoid, a pair of pin members for engaging and locking the bolts of a pair of doors of an automobile, and link members operatively connected between said pin members and said plunger, the said plunger in response to the magnetic field created by one winding of said solenoid actuating the said pin members to lock the said doors, and the said plunger in response to the magnetic field created by the other one winding of said solenoid actuating the said pin members by means of said link members to unlock the said doors.

5. In an apparatus of the class described, a double wound solenoid, a plunger positioned to reciprocate within said solenoid, a pair of pin members for engaging and locking the bolts of a pair of doors of an automobile, and link members operatively connected between said pin members and said plunger, the said plunger in response to the magnetic field created by one winding of said solenoid actuating the said pin members to lock the said doors, and the said plunger in response to the magnetic field created by the other one winding of said solenoid actuating the said pin members by means of said link members to unlock the said doors, and a magnetic means for holding the said pair of pin members in engagement with their respective doors bolt members to lock said doors by means of said plunger and said pair of link members.

ORVILLE L. BECK.